April 12, 1960     A. F. CARRINGTON     2,932,791
ELECTRICAL TEST APPARATUS

Filed March 21, 1958     4 Sheets-Sheet 1

INVENTOR.
ARTHUR F. CARRINGTON
BY
John J. Sullivan
ATTORNEY.

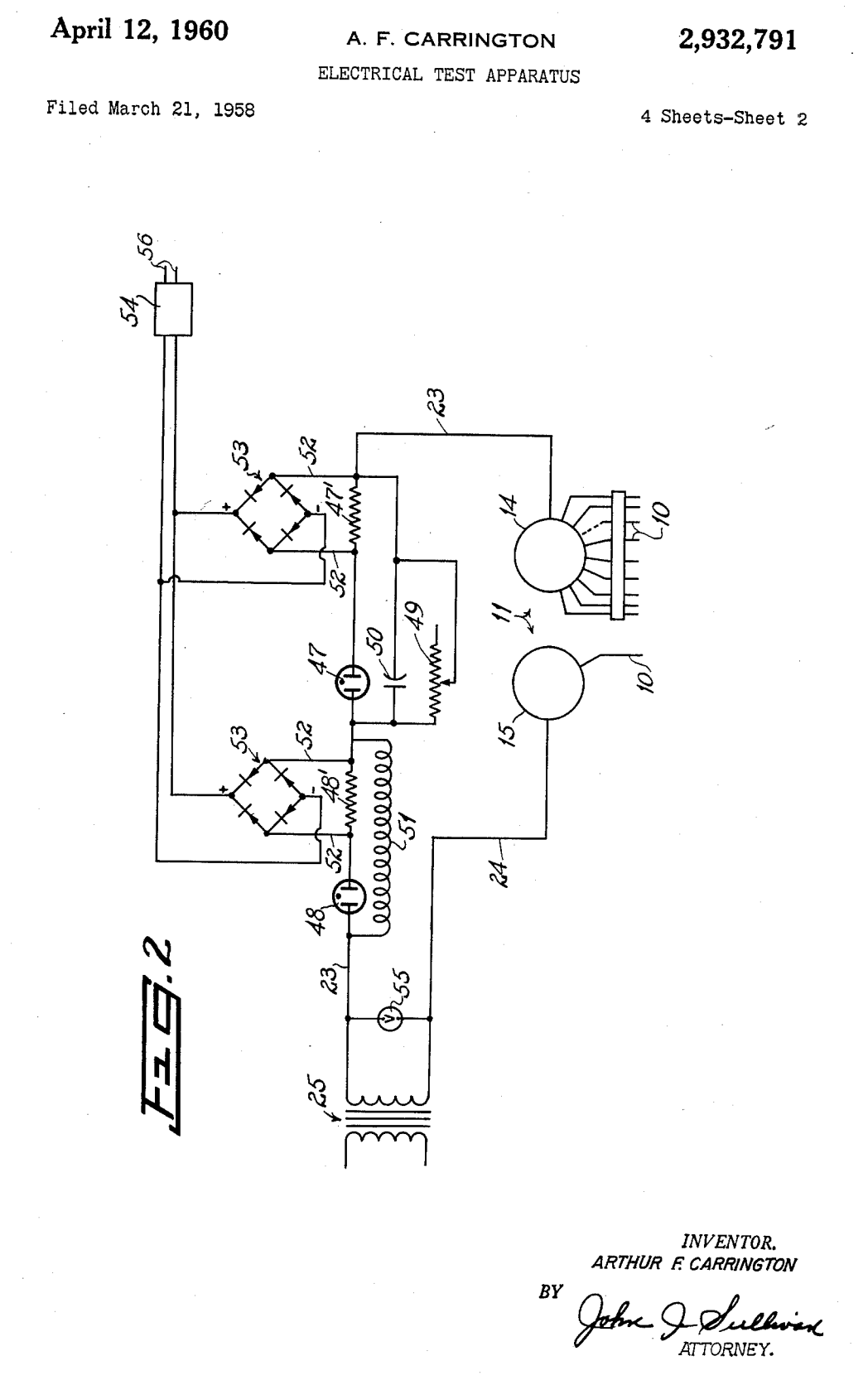

April 12, 1960  A. F. CARRINGTON  2,932,791
ELECTRICAL TEST APPARATUS
Filed March 21, 1958  4 Sheets-Sheet 2

FIG. 2

INVENTOR.
ARTHUR F. CARRINGTON
BY John J. Sullivan
ATTORNEY.

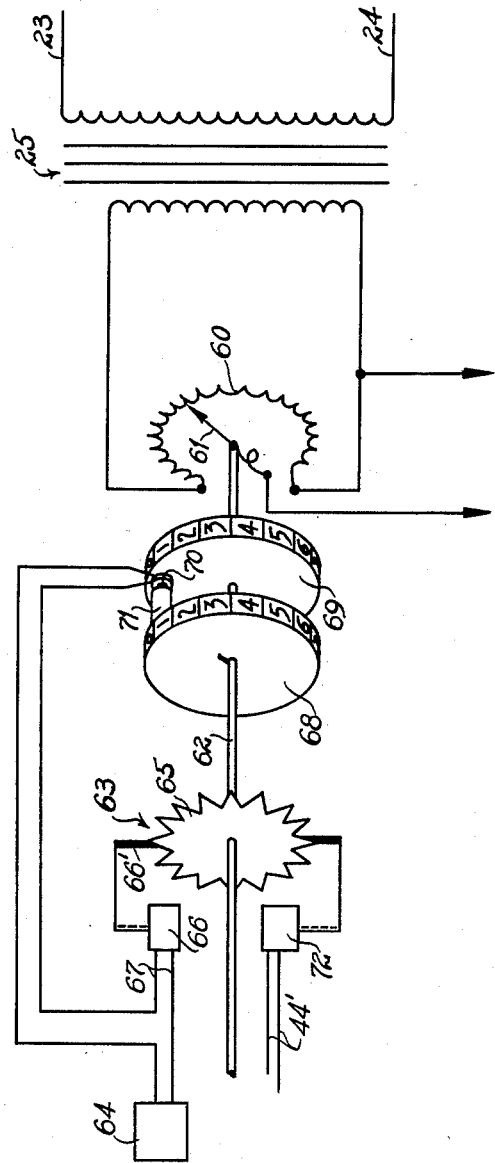

April 12, 1960     A. F. CARRINGTON     2,932,791
ELECTRICAL TEST APPARATUS
Filed March 21, 1958     4 Sheets-Sheet 4
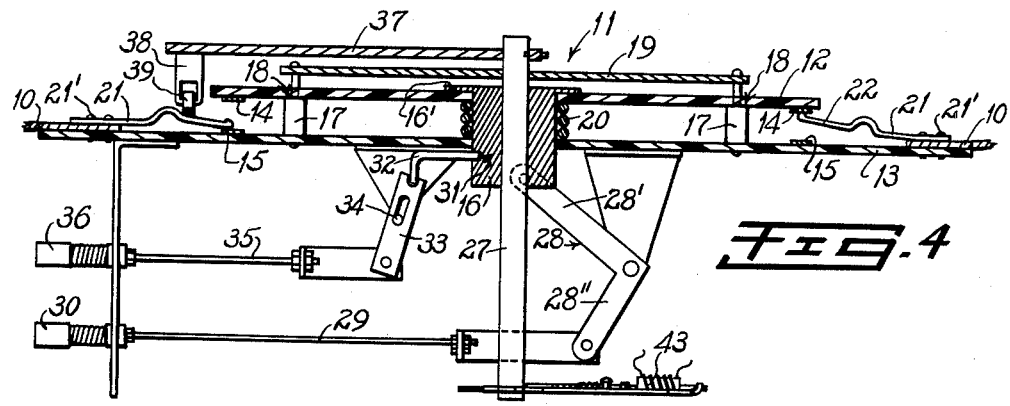
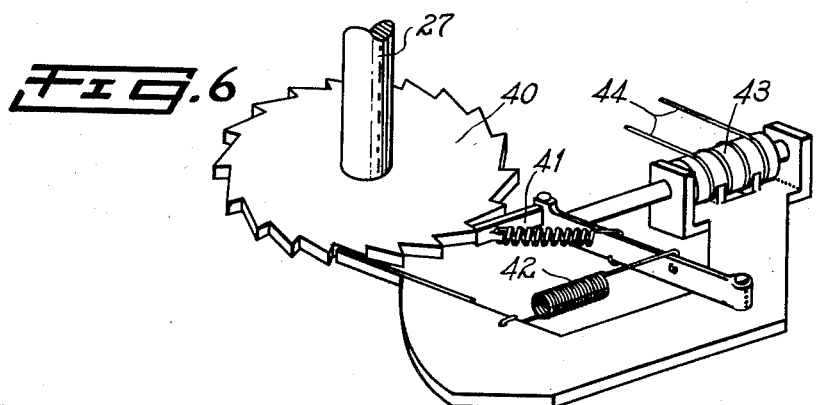
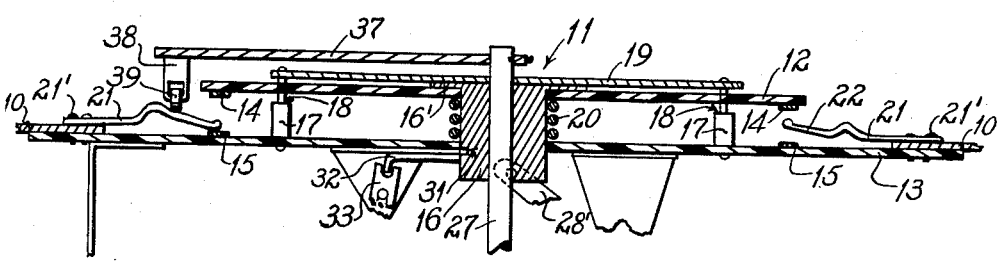
*INVENTOR.*
*ARTHUR F. CARRINGTON*
BY *John J. Sullivan*
*ATTORNEY*

United States Patent Office 2,932,791
Patented Apr. 12, 1960

2,932,791

ELECTRICAL TEST APPARATUS

Arthur F. Carrington, Amityville, N.Y., assignor to Republic Aviation Corporation, Farmingdale, N.Y., a corporation of Delaware Application March 21, 1958, Serial No. 722,958

12 Claims. (Cl. 324—73)

This invention relates to test apparatus and more particularly to a unit for testing the insulation of electrical conductors against voltage or potential leakage and indicating the cause and extent of such leakage, if any.

While the present invention may be employed to test a single electrical conductor for leakage, it is especially directed to those installations where multiple, individual conductors are employed in groups or bundles. In such cases, the instant test unit is capable of automatically and individually testing each separate conductor and indicating short circuits, if any, occasioned by direct contact of the conductor under test with another or other conductors in the group; any voltage leak in the test conductor with reference to a preestablished standard; and, in addition, the degree of such leak.

At the same time, the particular type of leakage may, if desired, be indicated, the types of leakage being, for example, mere leakage due to ineffective insulation, arcing due to leakage between adjacent conductors whose insulation is defective or ruptured, or capacitance effect, i.e. a relatively small leakage between adjacent conductors wherein alternating polarity induces a current flow between the conductors in spite of adequate insulation.

Moreover, the present test unit includes additional means to determine whether the leakage, if any, exists between each individual wire of a group and any other wire or between said individual wire and ground, i.e. to ground through structure with which the group is associated.

With the above and other objects in view, as will be apparent, this invention consists in the construction, combination and arrangement of parts all as hereinafter more fully described, claimed and illustrated in the accompanying drawings, wherein:

Fig. 2 is an electrical diagram of the circuitry connecting the "stepper switch," "high-voltage source" and "trouble-detecting device" illustrated generally in Fig. 1 to show the substantial details thereof for a clearer understanding of the essentials and operation of the test unit;

Fig. 3 is a schematic illustration partly in perspective of the "slow-voltage rise device" shown in Fig. 1 for selective interconnection into the circuitry illustrated in Fig. 2;

Fig. 4 is a transverse action taken through the "stepper switch" shown in Fig. 1 disposed in the operative or testing position to show the mechanical structure thereof;

Fig. 5 is a similar section, with parts broken away, of the "stepper switch" disposed in the inoperative position; and Fig. 6 is a perspective view of the drive mechanism for the "stepper switch" shown in side elevation in Fig. 4.

Figure 1:
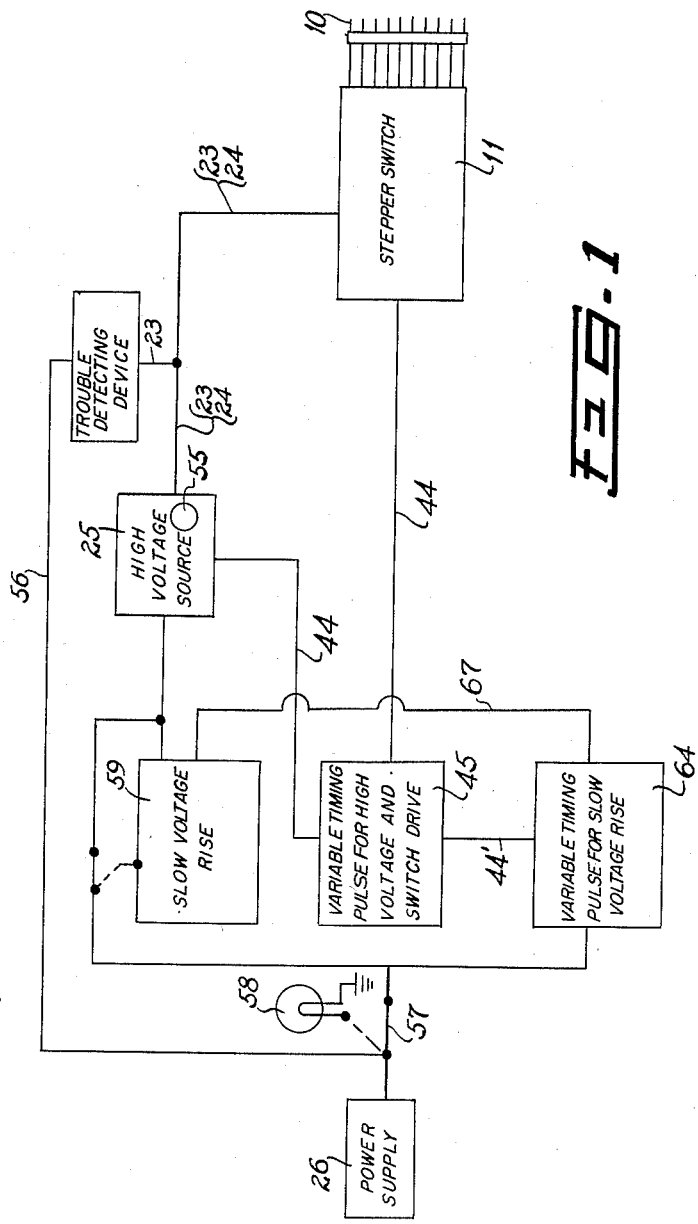
Fig. 1 is a general block diagram of the test unit to show schematically the interconnection of the several elements thereof.

One installation, for example, wherein the instant invention finds particular utility is in present-day aircraft in which relatively complex electrical circuitry is employed. Due to space limitations and the quantity of electrical conductors or wiring used in the aircraft, individual wires of the various circuits are, wherever possible, bundled, harnessed and, in general, crowded together. Under such conditions, leakage can not only result in inoperative equipment necessary to proper performance of the aircraft, but also in fire hazards, explosions, etc. which can be disasterous. Therefore, stringent requirements are exacted of all circuitry in the aircraft and careful tests must be made to insure the proper condition and functioning of all wiring.

So far as short circuits, leakage and arcing of the several conductors or wires are concerned, it has been the practice to manually check each wire one by one. This procedure is slow and arduous, requiring the complete attention and diligence of the individual making the test or inspection. Moreover, the value of such testing depends heavily on the human factor and therefore is subject to appreciable error. At the same time and regardless of the skill and attentiveness of the individual, if a short circuit or similar defect exists, it is possible for such test to result in irreparable damage.

It is to the above problems and others that the present invention is directed and proposes to solve. To that end, a compact, self-contained test unit is provided which is designed and adapted for temporary and simultaneous connection to every conductor to be tested. An adjusted voltage is then applied in automatic sequence to each conductor one by one. Unless and until leakage is detected in any one of the conductors, the test unit will make a complete cycle indicating that all of the conductors are adequately insulated one from the other and from ground.

If, however, one of the conductors is leaking, the test unit upon reaching the defective conductor will stop and signal means brings this fact to the attention of the operator. In addition, the applied voltage will be cut off when the current resulting from such contact reaches a predetermined value set into the unit. This value will always be substantially less than that required to effect any damage to the conductors, circuits or equipment.

Also included in and forming a part of the test unit is separate control means operative between the several conductors under test and the source of applied voltage. This control means permits the adjustment of the voltage whereby it may be applied at a gradually increased or stepped value. Thus, if desired, a relatively low voltage may be first applied to each conductor and increased in pre-set increments up to the maximum value of which the source is capable. In this way, the leak is detected at substantially the critical point of occurrence.

Referring more particularly to the drawings, 10 designates the individual conductors or wires to be tested when such wires are operatively connected to the present test unit through a rotary stepper switch 11. The switch 11 comprises a pair of discs or cards 12 and 13 disposed in substantially spaced, parallel relation. Each disc 12 and 13 is fabricated of dielectric material such as, for example, fiber glass or the like with the lower disc 13 being appreciably larger in diameter or area than the upper disc 12. On its lower or under face adjacent its outer edge, the upper disc 12 is provided with an annular electrical conducting element 14. A similar element 15 of equal diameter is provided on the upper or adjacent face of the lower disc 13 to the end that when the discs 12 and 13 are concentrically disposed with reference to each other, they lie substantially in a common vertical plane.

Each disc 12 and 13 is pierced centrally by an aperture for the passage therethrough of a bearing 16 employed to locate the discs in the concentric position. Supplementing the bearing 16 in this function is a plurality of stationary guide posts or stanchions 17 interconnecting the discs 12 and 13. More specifically, each stanchion 17 is secured to the upper face of the lower disc 13 to project therefrom and engage the upper disc 12. The outer end portion of each stanchion is of reduced cross-section or thickness to create a shoulder 18 medially of the length of the stanchion. A perforation is provided in the upper disc 12, corresponding to and in alignment with the reduced end of each stanchion for mating coaction therewith whereby the disc 12 is free to move vertically relative to the disc 13, being limited in its downward movement upon contact with the shoulder 18 on the stanchion.

At its upper or outer end, each stanchion 17 is provided with a stop such as, for example, a plate or spider 19 which overlies and is secured to the end of the stanchion. Thus, movement of the disc 12 relative to the disc 13 is limited to only the relatively slight vertical movement permitted between the shoulders 18 on the stanchions 17 and the plate 19.

Resilient means such as a compression spring 20 mounted between the discs 12 and 13 and disposed around the bearing 16 serves as a positive means tending constantly to move and hold the discs apart. Outward movement of the disc 12 on the bearing 16 is limited by a flange 16' formed on and projecting laterally from the end of the bearing 16 to abut the outer face of the disc 12 and thereby prevent removal of the disc 12 from the bearing 16 under the action of the spring 20. If desired, the disc 12 may be secured to the flange 16' by rivets, screws or the like.

Fixedly secured to the upper face of the lower disc 13 adjacent its edge is a plurality of spaced fingers or contacts 21. Each finger 21 is formed of flexible or spring material and projects radially and inwardly of the disc 13, being bent medially of its length to terminate in an unconnected or free end 22 normally disposed laterally outwardly of the disc 13 adjacent the annular element 14 on the upper disc 12. The secured end of each finger 21 is adapted to be connected, as shown generally at 21', to the end or terminal of one of the conductors 10 whereby electrical continuity of the connected conductor is extended through its respective finger 21.

Leads 23 and 24 connect the annular elements 14 and 15, respectively, to a relatively high-voltage source such as, for example, a transformer 25 connected to and adapted to be electrically energized by a suitable power supply 26. Thus, a relatively high voltage may be applied through the above connections to the annular element or ring 15. Since the ring 15 is insulated from the ring 14 and each of the associated conductors 10 by the dielectric or fiber glass disc 13 by which it is carried, any applied voltage from the power supply 26 and transformer 25 will normally be ineffective.

The stepper switch 11, however, includes additional means for selectively moving the discs 12 and 13 laterally relative to each other in opposition to the spring 20 to the end that certain circuits may be established, as will be explained. Such additional means preferably comprises forming the bearing 16 with a central aperture for the passage of a shaft 27 therethrough. Adjacent its lower end, the bearing 16 is connected to one arm 28' of a bellcrank lever 28. The other arm 28" of the bellcrank 28 is connected to a reciprocable or push-pull rod 29 which terminates in a spring-loaded button 30. Thus, when the button 30 is pushed against the normal action of its spring, the bellcrank 28 exerts a downward force on the bearing 16 and the disc 12 against the action of the spring 20. The disc 12 is thereby moved toward the disc 13 to bring the ring 14 into contact with the free ends 22 of the fingers 21.

A groove or recess 31 is formed or produced in the lower portion of the bearing 16 adjacent the connection of the bellcrank 28 to receive therein the outer end of a plunger 32 or its equivalent. In this manner, the bearing 16 and disc 12 are retained in a selected position relative to the lower disc 13 where the free ends 22 of the fingers 21 engage the ring 14 of the upper disc 12 to thereby establish an electrical connection therebetween.

When such an electrical connection is established, each of the conductors 10 under test is connected to ground through the fingers 21, ring 14 and lead 23.

At its other end the plunger 32 is connected to suitable operating linkage whereby it may be withdrawn from engagement with the bearing 16 to release it for movement under the normal action of the spring 20. Such linkage may comprise a teeter-type link 33, i.e. a link connected at one end to the inner end of the plunger 32 and pivoted medially of its length, as at 34. The other end of the link 33 is connected to a reciprocable rod 35 terminating in a spring-loaded button 36. Thus, when the button 36 is pushed to compress its spring, the link 33 is rotated on its pivot 34 and the plunger 32 is withdrawn from the recess 31 to free the bearing 16 for movement by the spring 20 to thereby dispose the disc 12 outwardly of disc 13 with the ring 14 out of engagement with the fingers 21.

Connected or keyed to the upper extremity of the shaft 27 to be disposed above and in spaced relationship to the disc 12 is an arm 37 which extends outwardly beyond the edge of the disc 12. A depending bracket 38 is fixedly secured to the outer end of this arm 37 and means such as a roller 39 is mounted on said bracket to project therefrom toward the lower disc 13. The connection of the bracket 38 and roller 39 to the arm 37 is such that the roller is disposed in the vertical plane of the fingers 21 adjacent the point where the free ends thereof project from the disc 13 for contact therewith. The roller 39 is thereby adapted to pass transversely over the fingers 21 when the arm 37 is rotated with the shaft 27 and the diameter of the roller is such that it is in contact with but one finger at a time. As the roller 39 thus engages a finger 21, the engaged finger alone is thereby compressed to disengage its free end from the ring 14 and to engage the ring 15.

From the foregoing, it is apparent that when a finger 21 engages the ring 15 in the above manner and voltage is applied to the ring 15 from the transformer 25 operatively connected to the power supply 26, electrical continuity is established from the transformer 25 to and through the connected conductor or lead 10 under test. Each of the conductors 10 under test may thus be connected to the transformer individually and sequentially by rotation of the arm 37 with its shaft 27 whereby the roller 39 successively compresses and releases each finger 21. At the same time, the remaining fingers 21 engage the ring 14 and complete individual, electrical connections through each of the wires 10, a finger 21 and ring 14 connected to lead 23 constituting the return leg to the transformer 25. At this time, no circuit is completed, however, unless some electrical connection is established between the wire 10 under test and the other wires 10 connected to ground. Such connection will be effected if there is a potential leak across the wires 10 and current will flow through the completed circuit.

In order to effect the sequential and successive connection of each finger 21 to the ring 15 as set forth above, an automatic drive mechanism is provided. Such a mechanism may comprise a ratchet 40 fixedly connected to the lower end of the shaft 27. A pawl 41 secured to and projecting from convenient stationary structure engages the teeth of the ratchet 40 under the action of biasing means such as a spring 42. Medially of its length, the pawl 41 is connected to the reciprocating rod of a driver or solenoid 43. The solenoid 43 in turn is connected through suitable leads or wires 44 to the power supply 26.

An adjustable control 45 such as for example a multivibrator tube is interposed in the line established by the leads 44 to energize the solenoid 43 at selected periodic time intervals for actuation of the pawl 41 against the operation of the spring 42. The ratchet 40 is thereby rotated by movement of the pawl 41 from one tooth of the ratchet to the next at the selected time interval. Such movement of the ratchet rotates or drives the arm 37 and its roller 39 for engagement of successive fingers 21 whereby each wire 10 and its circuit is placed under test in the manner outlined above. Thus, when the control 45 is set to the desired sequence, the ratchet 40 is actuated at the set time interval through the operation of the solenoid 43 and pawl 41 to successively engage and disengage the fingers 21 one by one with the ring 15. When voltage is applied to the ring 15, as described, each test circuit 10 may be checked to determine whether or not it, with reference to the other circuits and ground, is adequately insulated against leakage, arcing, shorts, etc.

To this end, additional trouble-detecting means such as a visual or audible alarm circuit, is interposed in the lead 23 (Fig. 2). More specifically, a pair of neon lamps 47 and 48 are disposed in series in the lead 23. Shunting the lamp 47 is an adjustable resistance or rheostat 49 in parallel with a capacitor 50. The capacitor 50 is adapted for relatively high frequency. Similarly shunting the lamp 48 is a coil or radio frequency choke 51. Associated with each of the lamps 47 and 48 is a relatively low resistance element 47′ and 48′ respectively, the ends of each of which are connected through suitable leads 52 to a rectifier bridge network 53 which in turn is connected to a remote voltage amplifier and relay 54. In addition, a voltmeter 55 is connected across the leads 24 and 23 to be disposed on the output side of the transformer 25.

When a relatively high voltage is applied to the ring 15 from the supply 26 and a lead 10 is connected to the ring 15 by its corresponding finger 21 under the action of the roller 39, unless there is a voltage leak in the test circuit thus established, this circuit is open and no current will flow. Hence, neither lamp 47 nor 48 will be lighted. However, should there be a leak in this test circuit, the circuit will be thereby closed causing a flow of current. If this current is of relatively low and unobjectionable frequency, it will follow the path of least resistance through the choke 51 bypassing lamp 48 and resistor 48′ and pass through rheostat 49 thereby also bypassing lamp 47 and resistor 47′. If this current is of relatively low frequency but exceeds that for which the rheostat 49 is set, it will flow through choke 51 as before; however, the excess current will pass through the lamp 47 causing it to light and through the resistor 47′. A signal voltage is thereby developed and transmitted through the leads 52 to the associated rectifier 53 and to the amplifier-relay 54.

If, on the other hand, the current passing through this circuitry is at a relatively high frequency and less than that preset in the choke 51, such current will bypass the lamps 48 and 47, passing through the capacitor 50 indicating that the circuit under test is adequate so far as a voltage leak is concerned. If, however, this frequency is relatively high and exceeds that pre-set in the choke 51, the excess thereof will pass through the lamp 48 lighting it and through the resistor 48′ to effect the same operation as that described in connection with the lighting of lamp 47. In either of these cases, i.e. when current is available to the amplifier-relay 54, the respective lamp 47 or 48 will glow, thereby informing the operator that an objectionable leak exists in the test circuit.

A relatively low frequency of the current in test circuit corresponds to and results from leaking of the conductor 10 under test due, for example, merely to defective insulation. A relatively high frequency, on the other hand, corresponds to and results from an arcing of the current across the conductor 10 under test and an adjacent conductor or grounded structure due, for example, to a break or rupture in the insulation. Hence, the illumination of the lamp 48 informs the operator that an arcing condition exists in the conductor 10 under test, while illumination of the lamp 47 informs the operator that an objectionable leakage of potential through its insulation exists in the conductor under test.

In either event, when either or both of the lamps 47 or 48 is illuminated and the amplifier-relay 54 is thereby energized, current passes through a conductor 56 to a switch 57 at the output side of the power supply 26. This switch normally closes and completes the circuit between the power supply 26 and the transformer 25. However, upon actuation of the amplifier-relay 54, the switch 57 is actuated to open such circuit whereby all power to the transformer 25 is disconnected and further functioning of the test unit ceases. In breaking the circuit between the power supply 26 and the transformer 25, the switch 57 concurrently completes a normally open circuit between the power supply 26 and a general trouble lamp 58 located on the face of the test unit in full view of the operator. Thus, while the trouble lamps 47 and 48 glow only momentarily, the trouble lamp will glow continuously although the test unit is otherwise disconnected from operation. The leak which exists in the conductor 10 under test, if of a sufficient magnitude, is thereby prevented from resulting in any damage to the test unit or its equipment as well as the wiring and components of the circuits under test.

As hereinabove described, the control or multivibrator 45 acts to drive the arm 37 at pre-set time intervals to sequentially connect and disconnect each conductor 10 for test. In order to adjust or set the voltage to be applied by the transformer at a given or desired value or a gradually increasing value from zero up to a predetermined maximum voltage, a slow-rise voltage control 59 is connected to the transformer 25 at the input side thereof. A switch interposed in the circuit between the power supply 26 and transformer 25 is operative to complete this circuit whereby the power supply 26 is operatively connected directly to the transformer 25 or, in the alternative, to break such circuit and concurrently operatively connect the control 59 in the circuit. When the device is so connected in the circuit, power from the supply 26 is made available to a variable auto-transformer 60 within the control 59. This variable auto-transformer 60 is operatively connected to the primary side of the transformer 25 and includes a contact or wiper arm 61 mounted on a shaft 62 driven by a drive mechanism 63 appropriately connected to a variable timing pulse 64 substantially like the adjustable control 45.

More specifically, the drive mechanism 63 comprises a ratchet 65 keyed or otherwise secured to the shaft 62 and solenoid 66, the reciprocating core 66′ of which engages and disengages the teeth of the ratchet 65 in the manner already described in connection with the ratchet 40. The solenoid 66 is provided with a pair of leads 67 connected at their opposite ends to the variable timing pulse or multi-vibrator tube 64 for actuation to engage and disengage the successive teeth of the ratchet 65 at the adjusted or pre-set time interval of the multi-vibrator 64.

Mounted on the shaft 62 between the ratchet 65 and the wiper arm 61 is a pair of adjacent wheels or discs 68 and 69. The disc 68 is splined or keyed to the shaft 62 for unitary movement therewith, while disc 69 is mounted for free rotation on the shaft 62 in any well-known manner. The edge of each disc 68 and 69 is similarly calibrated corresponding to a desired range of voltage. Mounted on and operative between each of the adjacent faces of the discs or indicators 68 and 69 is a microswitch 70 and an actuator 71 therefor each disposed in the path of rotation of, for contact with, the other. Thus, when the indicator 69 is rotated on the shaft to a given calibration, the indicator 68 is permitted to be rotated by the drive mechanism 63 until such time as the microswitch 70 and actuator 71 engage. At this time the microswitch 70 breaks the circuit between the multi-vibrator 64 and the solenoid 66 to stop and hold the value of the applied voltage at that set on the indicator 69.

When the control or multi-vibrator 45 is again energized at its set time interval to advance the arm 37 to the next, successive finger 21, this impulse passing through the lead 44 is also conveyed to the slow-voltage rise control 59 through the lead 44'. Lead 44' is connected at its other end to a return solenoid 72 identical in all respects to the solenoid 66 but mounted for engagement with the teeth of the ratchet 65 in opposition to the solenoid 66 whereby it rotates the ratchet 65, shaft 62, indicator 68 and wiper arm 61 to the original or zero voltage position.

When the next, successive finger 21 is engaged and compressed by the roller 39, the voltage from the transformer 25 is applied in gradually increasing increments as above. This operation is repeated until each of the fingers 21 and connected conductors 10 is thus checked. If a voltage leak or arc exists in any of the conductors 10 to the extent that the trouble-detecting device is rendered operative during the slow voltage application, the power supply 26 is disconnected and the general trouble lamp 58 is concurrently lighted. Thereafter, the test unit remains inoperative until the defect has been corrected or the test unit is advanced to the next conductor 10 for continued checking of the remaining conductors to be tested.

What is claimed is:

1. An apparatus for testing electrical conductors for potential leakage comprising a rotary switch including a pair of spaced, parallelly disposed cards of dielectric material, an annular conducting element mounted on adjacent faces of said cards in substantial alignment one to the other, said elements being connected respectively to opposed ends of a source of electric power, a compression spring mounted between and acting on and against said cards to maintain them apart, multiple contact fingers adapted to individually receive and connect each conductor to be tested normally disposed between and spaced from each of said elements, reciprocating means engaging one of the cards and operable to move said card in opposition to said spring whereby the conducting element thereof engages the fingers for the electrical interconnection thereof, an arm mounted for rotation in the plane of said fingers for engagement therewith to move one of said fingers against the conducting element of the other card to thereby establish electrical continuity therethrough to said source of electric power, a drive mechanism connected to said arm for the rotation thereof, an adjustable time control connected to said drive mechanism for the operation thereof at preselected intervals whereby each finger is individually and sequentially connected to the power source while the remaining fingers are interconnected as aforesaid, and an alarm circuit interconnected between one of said conducting elements and the power source.

2. An apparatus for testing electrical conductors for potential leakage comprising a switch including a pair of spaced conducting elements parallelly disposed and in substantial alignment one to the other, each of said elements being respectively connected to an opposed end of a source of electric power, multiple contact fingers individually connectable to a conductor to be tested and normally disposed between and spaced from each of said elements, reciprocating means operable to move one of said elements toward the other whereby said fingers engage the element thus moved and establish electrical continuity therethrough to the corresponding end of the power source, a movable arm constantly disposed in the plane of said fingers to engage and move one of said fingers into contact with said other element and establish electrical continuity therethrough to the corresponding end of said power source, a drive connected to said arm for the movement thereof, an adjustable time-pulsed control connected to said drive for the operation thereof at selected intervals whereby each finger is individually and sequentially connected to one end of the power source while the remaining fingers are connected to the other end of said power source when the reciprocating means is operative as aforesaid and disconnected from the other end of said power source when disposed in their normal position aforesaid, and an alarm connected between one of said elements and the power source.

3. An apparatus for testing electrical conductors for potential leakage comprising a pair of spaced, parallelly disposed conducting elements each connected to an opposed end of a source of electric power, a plurality of contacts each individually connected to a conductor to be tested and normally disposed between and spaced from each of said elements, reciprocating linkage connected to one of the elements and operable to move it toward the other element whereby it engages the contacts and establishes electrical continuity therethrough, movable means constantly disposed in the plane of said contacts to engage one of said contacts and move it against said other element to thereby establish electrical continuity therethrough, an adjustable, time-pulsed control connected to said means to move it into engagement with each successive contact individually and sequentially at selected time intervals, and signal means connected in series between one of said elements and said power source.

4. An apparatus for testing electrical conductors for potential leakage comprising a pair of annular, spaced conducting elements concentrically disposed in alignment one with the other on a common bearing, one of said elements being attached to for movement in unison with the bearing and each element being connected respectively to an opposed end of a source of electric power, multiple fingers of spring material individually connectable to a conductor to be tested and normally disposed between and spaced from each of said elements, operating linkage connected to the bearing and operable to move it and the attached element toward the other element whereby said attached element engages each of the fingers and establishes electrical continuity therethrough, a spring-loaded lock operable to engage and secure the bearing with the attached element in the fingers-engaging position aforesaid, an arm mounted for rotation in and projecting radially outward from said bearing, a roller carried by said arm at the outer end thereof and disposed in the plane of said fingers to engage and move one of said fingers into contact with said other element and thereby establish electrical continuity through said one finger and said other element to the power source, an adjustable time drive connected to said arm and operable at selected intervals to move it into engagement with each finger individually and sequentially, and an alarm connected in series between one of said elements and the power source.

5. An apparatus for testing electrical conductors for potential leakage comprising a pair of spaced, parallelly disposed conducting elements each connected to an opposed end of a source of electric power, a plurality of contacts each individually connected to a conductor to be tested and normally disposed between and spaced from each of said elements, reciprocating means engaging the first element and operable to move it toward the second element whereby it engages the contacts and establishes electrical continuity therethrough, a movable arm engaging one of said contacts and establishing electrical continuity through said contact and said second element to the power source, an adjustable voltage regulator connectable to the power source and operable when connected to control the potential output of said source whereby said output may be increased in predetermined increments, a variable time-pulsed drive connected to said arm and operable to move it into engagement with each successive contact individually and sequentially, and signal means connected between said first element and the power source.

6. An apparatus for testing electrical conductors for potential leakage comprising a pair of cards of dielectric material parallelly disposed in spaced relation on a common bearing, one of said cards being attached to the bearing for movement in unison therewith, an annular conducting element secured to the adjacent faces of said cards in alignment one to the other, said elements being respectively connected to opposed ends of a source of electric power, a spring interposed between the cards surrounding the bearing and operative to move and retain the bearing and attached card outwardly of the other card, guides carried by said other card and engaging said attached card to control and limit its movement as aforesaid, multiple fingers of spring material individually connectable to a conductor to be tested disposed side by side between the elements in spaced relation one to another and said elements, operating linkage connected to the bearing and operable to move it and the attached card inwardly of the other card whereby the element of said attached card contacts the fingers and thereby establishes electrical continuity therethrough, a lock to engage and secure the bearing with said element in the fingers-engaging position aforesaid, an arm fixedly mounted at one of its ends to a rotatable shaft piercing the bearing with its outer end projecting radially from said bearing and disposed in the plane of said fingers to thereby engage and move one of said fingers into contact with the element of said other card and establish electrical continuity therethrough to the power source, an adjustable, time-pulsed drive connected to said shaft to move the outer end of the arms into engagement with each finger individually and sequentially at selected intervals, and an alarm connected between one of said elements on the power source.

7. An apparatus for testing electrical conductors for potential leakage comprising a pair of spaced, parallelly disposed annular conducting elements each respectively connected to an opposed end of an electric power supply through a high-voltage source, a plurality of contacts each individually connected to a conductor to be tested and normally disposed in a common plane between and spaced from each of said elements, reciprocating means engaging the first element and operable to move it out of its normal position aforesaid to a position engaging the several contacts and thereby establishing electrical continuity therethrough, rotary engagement means constantly disposed in the plane of the contacts and connecting one of said contacts at a time to the second element whereby electrical continuity is established therethrough to said power supply, an adjustable voltage control including a variable auto-transformer and a drive mechanism therefor connectable between the power supply and voltage source whereby the potential output of said power supply is delivered to said voltage source in predetermined increments up to the adjusted value of said transformer, a variable, time-pulsed drive connected to the engagement means and said voltage control to rotate said engagement means and thereby connect each successive contact individually and sequentially to the second element at selected time intervals upon the complete operation of said voltage control while the remaining contacts are connected to said first element, and signal means connected in series between one of said elements and the power supply.

8. An apparatus for testing electrical conductors for potential leakage comprising a bearing, one fixed and one movable, conducting elements concentrically disposed on said bearing, each element being respectively connected to an opposed end of a high-voltage source, an electric power supply connected to said voltage source, a plurality of contacts each individually connected to a conductor to be tested and normally disposed between and spaced from said elements, operating linkage connected to the bearing and operable to move it and the movable element toward the fixed element to a position where said movable element engages the contacts to thereby establish electrical continuity therethrough, a movable arm constantly disposed in the plane of said contacts to engage and move one of said contacts against the fixed element to thereby establish electrical continuity therethrough, an adjustable, time-pulsed drive connected to said arm to move it from one contact to the next successive contact at selected time intervals while the remaining contacts are connected to the movable element, and an alarm connected between one of the elements and the high-voltage source, said alarm including a pair of lamps connected in series, a radio frequency coil shunting one of said lamps, a rheostat and high-frequency capacitor in parallel shunting the other of said lamps, a relatively low-resistance element connected to each lamp, a rectifier bridge network connected across each said low-resistance element, a voltage amplifier and relay connected at one side to the output sides of said bridge networks and at its other side to the output side of the power supply, a normally disconnected lamp connected to the power supply at its output side and a switch interposed between said normally disconnected lamp, the relay and the power supply for actuation by the relay when energized to disconnect the power supply from the voltage source and connect said power supply to said normally disconnected lamp.

9. An apparatus for testing electrical conductors for potential leakage comprising a centrally perforated bearing, a pair of cards of dielectric material parallelly disposed in spaced relation on said bearing, one of said cards being movable with the bearing and the other card being fixed against movement, a conducting element secured to the adjacent faces of said cards in alignment one to the other, each of said elements being respectively connected to an opposed end of a source of electric power, a spring interposed between the cards surrounding the bearing and operative to move and retain the bearing and movable card outwardly of the fixed card, guides carried by the fixed card and engaging the movable card to control said movement and to prevent all other relative movement between the cards, multiple fingers of spring material individually connectable to a conductor to be tested disposed between the elements, operating linkage connected to the bearing and operable to move it and the movable card inwardly of the fixed card against the action of the spring whereby its element contacts the fingers and thereby establishes electrical continuity therethrough, a releasable automatic lock to engage and secure the bearing with said element in the fingers-engaging position aforesaid, an arm disposed in the plane of said fingers to constantly engage and move one of said fingers into contact with the element of the fixed card and establish electrical continuity therethrough to the power source, a shaft piercing the bearing through the perforation therein and connected to said arm, a ratchet fixedly secured to said shaft, a spring-loaded pawl normally engaging a tooth of said ratchet, actuating means connected to said pawl to move it out of its normally engaged position and into engagement with the next successive tooth for rotation of the ratchet thereby, a multivibrator tube connected to the power source and to said actuating means for the periodic operation thereof whereby the arm is moved into engagement with each finger individually and sequentially while the remaining fingers are connected to the element of the movable card, and an alarm connected in series between one of said elements and the power source.

10. An apparatus for testing electrical conductors for potential leakage comprising a pair of spaced, parallelly disposed conducting elements each respectively connected to an opposed end of a source of electric power, a plurality of contacts each individually connected to a conductor to be tested and normally disposed between and spaced from each of said elements, reciprocating means engaging one of the elements and operable to move it toward the other element whereby it engages the several contacts and establishes electrical continuity therethrough, movable means constantly disposed in the plane of said contacts and engaging only one of said contacts at a time to move the engaged contact against said other element to thereby establish electrical continuity therethrough, a drive connected between the power source and said movable means for engagement thereby with the contacts individually, a variable timing pulse connected to said drive for the operation thereof whereby said means engages each successive contact for a given time interval, and signal means connected in series between one of said elements and said power source.

11. An apparatus for testing electrical conductors for potential leakage comprising a voltage source, a supply of electric power connected to said voltage source, a pair of spaced, parallelly disposed conducting elements each respectively connected to an opposed end of said voltage source, an adjustable regulator interposed between the voltage source and the power supply to control the voltage output of said voltage source, a variable timing pulse connected to said regulator for the application of the voltage in selected increments up to the adjusted output, a switch for the connection and disconnection of said regulator for operation, a plurality of contacts each individually connected to a conductor to be tested and normally disposed between and spaced from said elements, reciprocating means engaging one of the elements and operable to move it toward the other element whereby it engages the contacts and establishes electrical continuity therethrough, movable means constantly disposed in the plane of said contacts to engage one said contact and move it against said other element to thereby establish electrical continuity therethrough, a drive connected between the power source and said means to move it into engagement with the contacts individually while the remaining contacts are connected to said other element, a variable timing pulse connected to said drive for the operation thereof whereby said means engages each successive contact for a given time interval, said pulse also being connected to the regulator for the synchronized operation of the drive with the regulator when the latter is connected, and signal means connected in series between one of said elements and said power source.

12. An apparatus for testing electrical conductors for potential leakage comprising a pair of spaced, parallelly disposed conducting elements each respectively connected to an opposed end of a source of electric power, a plurality of contacts each individually connected to a conductor to be tested and normally disposed between and spaced from said elements, reciprocating means engaging one of the elements and operable to move it toward the other element whereby it engages the contacts and establishes electrical continuity therethrough, means constantly disposed in the plane of said contacts to engage one of said contacts and move it against said other element to thereby establish electrical continuity therethrough, an adjustable, time-pulsed drive connected to said means to move it into engagement with each successive contact individually and sequentially at selected time intervals while the remaining contacts are connected to said other element, a pair of signals connected in series between one of said elements and said power source, and a bypass circuit including impedance elements of selected values shunting each signal whereby the characteristics of current passing therethrough may be determined.

References Cited in the file of this patent

UNITED STATES PATENTS

| | | |
|---|---|---|
| 1,977,703 | Swartwout | Oct. 23, 1934 |
| 2,310,335 | Wolfson | Feb. 9, 1943 |